Sept. 18, 1962
L. J. COLBERT
3,054,847
CABLE SPLICE ENCLOSURE
Filed Sept. 22, 1960
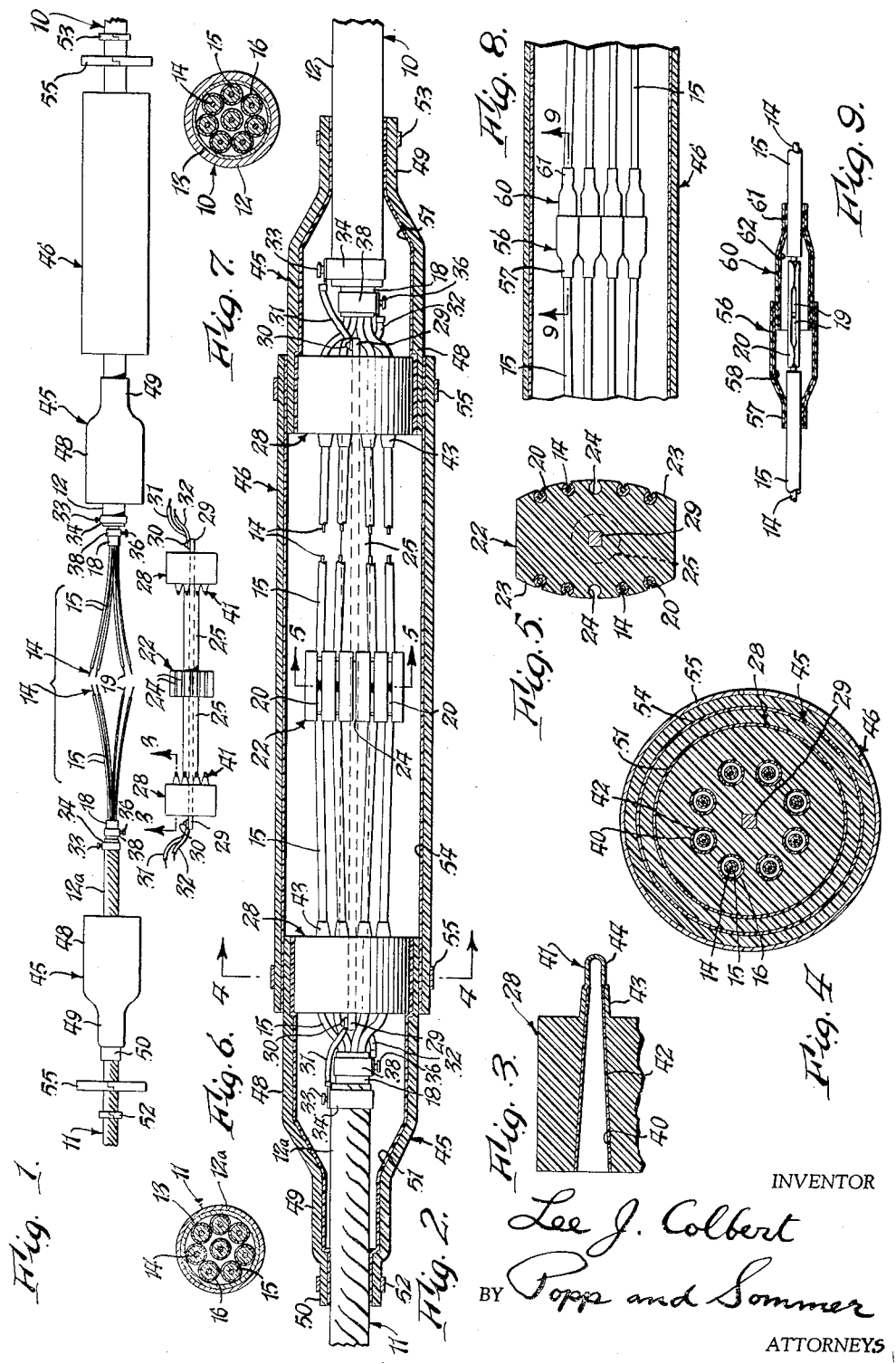
INVENTOR
Lee J. Colbert
BY Popp and Sommer
ATTORNEYS United States Patent Office 3,054,847
Patented Sept. 18, 1962

3,054,847
CABLE SPLICE ENCLOSURE
Lee J. Colbert, 58 Smallwood Drive, Snyder, N.Y.
Filed Sept. 22, 1960, Ser. No. 57,764
11 Claims. (Cl. 174—88)

This invention relates to a case or housing for enclosing the splices made in electrical multi-wire cables and is more particularly illustrated as an enclosure for commercial outdoor multi-wire communication cables to protect the splices of the several wires from weather and to hold them in isolated relation to one another, although the invention is also applicable to power cables to underground or underwater as well as indoor service.

This application is a companion to my copending application for Cable Splice Enclosure, Serial No. 705,240, filed December 26, 1957 now Patent 2,978,533, dated April 4, 1961.

In common with my said copending application, a general object of the present invention is to provide such an enclosure for cable splices which can be quickly and reliably attached and which can be readily removed and replaced as conditions may require.

Another general object is to provide such an enclosure which can be readily attached to cables of different standard sizes.

Another general object is to provide such an enclosure which will stand up under severe weather conditions and in which seals are provided against the entrance of moisture, water or other gases or fluids to the cable splice.

A specific object of the present invention is to provide such an enclosure which, in addition to the housing, includes internal bulkheads through which the wires of the cable ends extend and which serves both as a bulkhead seal to prevent seepage of moisture or ambient gas or fluids to the splice and also serves to hold the several wires in spaced relation.

Another specific object is to provide an enclosure having such bulkheads in which the bulkheads are reliably sealed both against the enclosing housing and against the wire or wires extended therethrough so as to additionally seal the splice against leakage from the outside.

Another object is to provide such an enclosure including such bulkheads, which embodies a ground bus bar with ground connections to the metal sheath or sheaths at the cable ends being connected.

Another object of the invention is to provide a simple and effective means for enclosing the splice of each wire of a multi-wire cable and holding the splices in electrically isolated relation to each other.

Another object is to provide such an enclosure which is easy to open for the purpose of using additional wires, or changing the connections of existing wires, of the multiple wire cable or for the purpose of adding a new cable.

Another object is to provide such an enclosure in which the various wires are held in orderly spaced relation to one another so that upon opening the enclosure the various wires can be readily identified and marked.

Another object is to provide such an enclosure which, having been so opened, can be readily closed and resealed, using the original parts.

Other specific objects and advantages of the invention will be apparent from the following description and drawings in which:

FIG. 1 is an exploded view of an enclosure embodying the present invention for outdoor multi-wire cable splices.

FIG. 2 is a longitudinal central section through an assembled enclosure of the form shown in FIG. 1.

FIG. 3 is an enlarged fragmentary section through one of the bulkheads of the enclosure, the section being taken generally on line 3—3, FIG. 1.

FIG. 4 is an enlarged vertical transverse section taken generally on line 4—4, FIG. 2.

FIG. 5 is an enlarged transverse section through the splice block which carries and supports in spaced relation the electrically connected or spliced ends of the several conductors, this section being taken generally on line 5—5, FIG. 2.

FIG. 6 is an enlarged cross section through one of the cables, this being a helically armored cable shown at the left of FIGS. 1 and 2.

FIG. 7 is a cross section through the other cable shown at the right of FIGS. 1 and 2 and which is a lead sheathed cable.

FIG. 8 is a fragmentary view similar to the central portion of FIG. 2 and showing another method of maintaining the spliced metallic ends of the several conductors in spaced insulated relation to one another.

FIG. 9 is an enlarged fragmentary sectional view taken generally on line 9—9, FIG. 8.

While the enclosure of the present invention is intended for use with any conventional type of multi-wire cable, it is shown as enclosing the splices between the wires of a multi-wire lead sheathed cable 10 and a helically armored cable 11. The only distinction between these cables is that the outer sheath 12 of the lead sheathed cable 10 is in the form of an unbroken coating or skin of lead, whereas the corresponding outer sheath 12a of the helically armored cable 11 is in the form of a helically wound metal strip 12a, the edges of which are suitably interlocked. With either of the cables the outer sheath 12 or 12a encases an inner sheath 13 of aluminum, copper or other electrically conductive material and which contains the multiplicity of wires the conductors of which are severally spliced together. Each of these wires comprises a metal conductor wire 14 having an insulation coating 15 of plastic or other dielectric material, and this coating in turn can have a coating 16 of copper or the like, these copper coatings 16 being in contact with one another as well as with the copper sheath 13 for the cable as a whole.

In preparing the two cables 10 and 11 for splicing, as hereinafter described, the outer lead or helically wound sheath 12, 12a is removed a substantial distance back from the opposed cable ends, say 11½ inches from each end, whereas the inner copper or aluminum sheath 13 is removed a shorter distance back from the end of the cable so as to leave an exposed portion 18 of, say, 1 inch of this inner copper or aluminum sheath projecting beyond the outer sheath 12 or 12a. The individual insulated wires 14, 15, 16 accordingly project beyond this inner metal sheath 13 a corresponding distance of 10½ inches and the end extremities of the copper coated insulation 15, 16 of the several metal conductors are stripped back to expose the ends of the metal conductors 14, as indicated at 19, for the purpose of electrically connecting the conductors 14 of the cable 10 with the conductors 14 of the cable 11.

This electrical connection of the exposed ends 19 of the several metal conductors 14 of the two cables 10 and 11 can be effected in any suitable manner, as by twisting together, by solder or by the tubular metal connectors 20 shown. These connectors are conventional and each consists of a longitudinally split metal tube which is brought into embracing relation with a pair of the exposed ends 19 of the conductors 14 of the wires of the two cables 10 and 11 and squeezed together to provide the electrical connection.

In the form of the invention shown in FIGS. 1–7, the several conductors 14, so spliced, are pressed into the peripheral portion of a splice block 22 made of dielectric material. Both for itself and because it is integral with bulkheads as hereinafter described the composition of this splice block is important. Desirably it is made of polyethylene, polyvinylchloride, natural or synthetic rubber or other manually resilient organic plastic. Desirably the splice block 22 and the parts integral therewith have in the order of 70 durometer resilience.

The splice block 22 is shown as being in the form of a block having a flat top and bottom and rounding sides 23. These rounding sides are provided with a plurality of parallel grooves 24 which are semicircular in cross section extending from one end of the block to the other and each of which is preferably somewhat more than 180° in extent so that the lips of each groove must be displaced slightly on pressing the connector 20 for a corresponding pair of spliced conductor ends into each groove and so that this connector is retained against accidental displacement from its groove, but can be manually removed if desired. The resilience of the plastic used is important to this end.

The splice block 22 is provided with integral oppositely extending rods 25 arranged generally parallel with the slots 24 and connecting this splice block with a pair of cylindrical bulkheads 28, which are also integral with the rods 25 and block 22 and hence made of the same resilient plastic as the splice block 22 as discussed in detail above. The rods 26 are shown as being of cylindrical form and the bulkheads 28 are in spaced relation to the splice block 22, and a ground bus bar 29 extends axially through this assembly 22, 25, 28 and has its ends projecting axially from the opposite ends thereof. This bus bar 29 is for the purpose of providing a ground connection between the cables 10 and 11 and for this purpose is provided with a screw or binding post 30 at each of its opposite extremities. A pair of wires 31 and 32 are connected to each of these binding posts 30. The other end of each wire 31 is connected to the binding post 33 of a ground clamping ring 34 which embraces and is electrically connected to the corresponding sheath 12, 12a of the corresponding cable 10 or 11. The other wire 32 is shown as connected to the binding post 36 of a clamping ring 38 which embraces and is electrically connected to the projecting end 18 of the inner metal sheath 13 of the corresponding cable 10 or 11.

Each bulkhead 28, so made of a manually resilient organic plastic, has a plurality of bores 40 extending axially therein, the number of such bores being equal to the number of wires within the cables 10 and 11. Each of these bores, in the original condition of each bulkhead, is a blind bore which is open at the end face of the bulkhead from which the ground bus bar 29 projects but has its blind end terminating in a teat or like projection 41 which is integral with the body of the bulkhead. Each of these bores is of tapering form diminishing from a large diameter open end toward its blind extremity in the corresponding teat 41. Each of these bores is also preferably homogeneously lined with a plastic 42 of substantially softer character than the plastic from which the body of the bulkheads 28 and the bars 25 connecting these bulkheads with the central splice block 22. The plastic of the lining 42 is soft enough to adapt itself to the exterior of wires forced into the bores and preferably has in the order of 30 durometer resilience. Each teat 41 is shown as having a frusto-conical tubular base portion 43 and a cylindrical extension 44 projecting from the outboard extremity of this base portion, the outer end of which is closed. The wall thickness of the frusto-conical base portion 43 is preferably greater than the wall thickness of the end extension or cap 44 and preferably the soft lining 42 terminates within the frusto-conical base portion 43. The tapering form of the bore 40 extends into the base portion 43 of the corresponding teat so that the smallest diameter portion of this taper is at the outer extremity of this frusto-conical base section. The several wires 13, 14, 15 of each cable 10, 11 are severally threaded or pushed through these bores 40 in a manner hereinafter described.

The splices, together with the splice block 22, rods 25 and bulkheads 28, are contained within an enclosure comprising a pair of end heads 45 and a tubular sleeve 46 connecting these end heads. Each end head 45 is preferably constructed in the manner in my copending application, Serial No. 705,240, filed December 26, 1957 for Cable Splice Enclosure and to which reference is made for a more detailed description. As described in this copending application, each end head is of cylindrical cup-like form and made of a moldable flexible material which has good weather resisting properties. Depending on the temperature or other conditions encountered the end heads could be polyethylene, polyvinylchloride, natural or synthetic rubber or other manually resilient organic plastic preferably being in the order of 70 durometer resilience. The cup-shaped body portion 48 of each end head has a step-down neck portion including an inboard maximum neck diameter section 49 and an outboard neck portion 50 of smaller diameter.

In such manner the enclosure can be used with cables of different sizes, it being only necessary to cut off a smaller diameter outboard neck portion 50 for fitting to cables of larger diameter. As illustrated, the lead sheathed cable 10 is of larger diameter than the cable 11 having a helically armored sheathing and hence the end head 45 for the helically armored cable 11 has its smaller diameter outboard end extremity 50 in contacting relation with the sheath of this cable whereas it is shown as having its reduced diameter outboard end extremity 50 cut off and its larger diameter portion 49 in contacting relation with the lead sheathing of the larger diameter cable 10.

As with the said copending application, a lining 51 of a soft plastic material is arranged within each of the portions 49, 50. This lining preferably extends the entire interior of each end head so as to form a seal with each bulkhead 28, as herein described. This lining 51 is in the form of a plastic homogeneously united to each end head but materially softer than the composition of the end head so that it can flow and adapt itself to the external surface of the cables 10 and 11. It preferably has in the order of 30 durometer resiliency.

A clamping ring 52 embraces and holds the smaller diameter outboard end 50 of the corresponding end head 45 in compressive relation with the exterior of the helically armored cable 11. A clamping ring 53, of larger diameter than the clamping ring 52, embraces the inboard neck portion 49 of the opposite end head and holds it in compressive relation with the lead sheath of the cable 10. These clamping rings are shown as being out of the form illustrated in FIG. 7 of my said copending application and to which reference is made for a more detailed description. In general, these clamping rings are split rings made of spring metal and are provided with ends having sliding engagement with each other to exert continued compressive pressure upon the necks 49, 50 and maintained a seal regardless of any cold flow of the relatively soft liner 51.

The opposite ends of the tubular sleeve 46 embrace the rims of the cup-shaped end heads 45 as well as the bulkheads 28. The body of this sleeve can be made of the same manually resilient plastic as the end heads 45 and the splice block, rod and end head assembly 22, 25, 28. At least at these ends the tubular connecting sleeve 46 is provided with a lining 54 of soft resilient plastic material, similar to the linings 42 and 51, which embraces the corresponding end head 45 and which serves to flow and establish a sealing fit between the tubular sleeve 46 and each cup-shaped end head. The opposite ends of the tubular sleeve 46 are held in compressive relation with the cup-shaped end heads 45 and bulkheads 28 by clamping rings 55. These clamping rings are preferably of the same form as the clamping rings 52 and 53, but larger, and hence conform to the clamping ring illustrated in FIG. 7 of my said copending application.

In the practice of the present invention the opposing ends of the cables 10 and 11 are usually brought into slightly overlapped relation and the exterior metal sheath 12, 12a of each cable removed a substantial distance back from the opposed cable ends, this distance having been assumed to be 11½ inches. The splice is shown as assumed to be between a lead sheathed cable 10 and a helically armored cable 11, the latter being assumed to be of smaller outside diameter than the former. Following the removal of the outer lead and helically wound metal sheaths 12, 12a, respectively, of these cables, the inner copper or metal sheath 13 is removed a shorter distance back from the end of the cable so as to leave an exposed portion 18 of one inch or so projecting beyond the outer sheath 12 or 12a. The insulation 14 is thereupon removed from the ends of those individual wires which are to be employed, thus exposing the end extremities of the metal conductors 14 of these selected wires, as indicated at 19.

As best illustrated in the exploded view of FIG. 1, the smaller clamping rings 52 and 53 are first threaded over the cables 11 and 10, respectively. Following this, the tubular sleeve 46 is threaded over one or the other of these cables. Following this, the end head 45 is slipped over the smaller diameter cable 11. The outboard end extremity 50 of the neck of the other end head 45 is then cut off and this end head is slipped over a larger diameter cable 10.

The electrician then takes the unitary central plastic structure or assembly consisting of the splice block 22, axial rods 25 and bulkheads 28 and cuts off the end extremities 44 of the teats 41 of each end head in a number corresponding to the number of wires which are to be spliced. This converts the corresponding blind bores 40 in each end head to through bores of tapering form diminishing toward the base portion 43 of the teats from which the end portions 44 have been so removed.

The electrician now fits the first ground clamping ring 34 and then the smaller ground clamping ring 38 over the end of each cable. The larger ground clamping ring 34 is brought into embracing relation with the sheath 12 or 12a, after cleaning the same, and clamped thereon so as to provide a ground connector. Similarly the smaller ground clamping ring 38 is brought into embracing relation with the projecting end 18 of the inner copper or aluminum sheath 13 and tightened thereon so as to provide a connector grounded on each of the inner sheaths.

The electrician then threads or pushes or draws the individual wires to be used through those bores 40 which he has so changed from blind bores into through bores by the removal of the end extremities 44. In so drawing these wires through, the plastic insulation coating 15 of each metal wire 14 is brought into compressive relation with the soft lining 42 of the bore 40 so as to be held compressed within this bar, the soft lining 42 also being under compression so as to provide a seal in preventing the passage of fluids through the bulkheads 28 via these through bores 40. So drawing the individual wires through these bores 40 also serves to remove anything on the exterior of the insulation of these conductors, particularly any parts of the copper coating 15, jute or other materials contained within the cable.

The exposed ends 19 of the two cables 10, 11 are then mated and inserted into the ends of the split tubular metal connectors 20 in opposed relation to each other. These tubular connectors are then squeezed into firm electrically conductive relation with each pair of the exposed ends 19 of the conductors 14 so as to provide the electrical connections between the several conductors.

In order to hold these connectors 20 in orderly spaced relation to one another, each is pressed into a corresponding groove 24 of the splice block 22 which are semicircular in cross section for this purpose. These semicircular grooves are preferably slightly more than 180° in extent so as to have lips which are displaced in so inserting these wires and which lips serve positively to hold these wires against displacement from their respective grooves.

The wires 31, 32 at each end of the metal ground bar 29 are then connected, respectively, to the binding posts 33, 36 of the respective ground clamping rings 34, 38. This completes the electrical connection of the splice, and the remaining steps are to complete the enclosure of this splice.

For this purpose the two end heads 45 are moved axially toward each other to a position where their enlarged rims severally embrace the bulkheads 28. When this is done, it will be noted that the soft homogeneous lining 51 of each of these end heads is brought into contact with the periphery of each bulkhead. In this position the neck portion 49 of one of these end heads embraces the larger diameter lead sheathed cable 10 and its soft lining 51 is in closely fitted relation to this lead sheath. The neck portion 50 of the opposite end head 45 is in embracing relation to the smaller diameter helically wound sheath 12a of the cable 11 and its soft lining 51 is in closely fitted relation to this sheath.

The clamping rings 52 and 53 are then expanded and slipped over the neck portion 50, 49, respectively. Upon release of these clamping rings they contract into engagement with these neck portions and serve to compress the soft linings 51 into engagement with the sheaths of these cables and provide a weather-tight seal. In the event of any cold flow of the soft linings 51 of a long period of time, the inherent resilience of these clamping rings 52, 53 will contract further and compensate for this cold flow and draw the necks 50, 49 together into a further restricted condition to maintain the weather seal.

The outer tubular sleeve 46 is now drawn over the splice so that its opposite ends embrace opposing ends of the end heads 45 as well as the bulkheads 28. This brings its soft lining 54 into engagement with the peripheries of the end heads 45. The pair of large clamping rings 55 are then expanded and slipped over the end extremities of the tubular sleeve 46. Upon release these rings draw the ends of this tubular sleeve into compressive relation with the end heads 45 as well as the bulkheads 28, the latter serving as a solid backing for the compressive action of these rings 55. This compressive action of these rings 55 serves to compress and displace the soft lining 54 and provide a weather-tight seal between the tubular sleeve 46 of each of the end heads 45. As with the other rings 52, 53, in the event of any cold flow of the soft lining material 54, the rings 55 will contract further to compensate for such displacement of this plastic liner.

It will be noted that the form of the invention shown in FIGS. 1–7 provides a splice in which the cable can be easily prepared for splicing; the wires on being drawn through the bulkheads 28 are individually weather sealed in relation to the bulkheads; the individual splices of the several wires readily effected; the individual splices easily inserted into the grooves of the splice block 22 so as to be reliably held in electrically isolated relation to one another; the end heads 45 are readily brought into operative position and provided with weather seals against the external sheaths of the cables; and the tubular sleeve 46 is readily brought into position and into weather sealed relation with both of the end heads 45. It will also be noted that each of these end heads 45 is held in weather sealed relation to the bulkheads by the same clamping rings to provide the weather seal between the tubular sleeve 46 of these end heads 45. Accordingly, the spliced ends 19 of the several conductors are reliably protected against weather conditions at all points of possible leakage.

It will also be noted that the splice is readily accessible for changes in wiring or in adding unused wires into circuit, this being accomplished by expanding and removing the clamping rings 55 which permits the tubular sleeve 46 to be moved axially to expose the splice. So exposed the various spliced wires are in orderly arrangement for realinement. Upon completing revisions of the multi-wire splice the tubular sleeve 46 is slipped back into position and its clamping rings 55 replaced into operative position as described.

It will also be noted that the bulkheads 28 serve to space the wires and that even if the end heads 45 should fill up with water, the splices would be isolated from this water. Such filling of the end heads could occur because of a break in either sheath 12 or 12a beyond the splice, particularly in underwater or underground use.

If still greater protection of the individual spliced ends of the several wires of the cable is required, the form of the invention shown in FIGS. 8 and 9 can be employed in lieu of the splice block 22. In this form of the invention, instead of the splice block 22, the individual splices are severally protected by telescopically interfitted tubular members made of dielectric material each having a reduced end closely fitting the insulation of the spliced wire and each also having a lining of soft resilient plastic material providing a seal not only between the two sections, but also between the reduced end of each section and the insulation of the wire.

This modification, as illustrated in FIGS. 8 and 9, comprises an outer tubular member 56 of relatively large diameter having a reduced neck 57 at one end slipped over and closely having the insulation 15 of one wire and also having a lining 58 of soft resilient plastic material extending from one end thereof to the other. The body of the sleeve 56 is preferably made of a manually flexible plastic similar to the body portions of the end heads 45, tubular sleeve 46 and splice block-rod-end head assembly 22, 25 and 28. The material of the lining 58 is similar to the material of the linings 40, 51 and 54. Similarly, the companion section 60 has a body and a reduced neck 61 made of a similar soft resilient plastic material, the reduced neck closely fitting the insulation of the other joined wire and being lined with a similar lining 62 of soft resilient plastic material, the latter being in compressive relation to the insulation of this other wire to provide a weather seal. The softer lining 58 of larger section 56 compressively fits and provides a seal at the clamping ends of the two sections as illustrated.

It will be seen that by this arrangement, in addition to the seals between the main end heads 45 and the cable sheaths 12, 12a, and in addition to the seals between these end heads and the connecting tubular sleeve 46, and in addition to the seals between each bulkhead 28 and the serving housing, and in addition to the seals provided in each bulk head 28 around each of the wires, the individual splice between each pair of wires is additionally sealed by the sections 56 and 60. Accordingly, if water should get into the main casing past its bulkheads, the spliced ends of the several wires therein will still be severally isolated from one another.

From the foregoing it will be seen that the present invention provides an exceptionally well sealed enclosure for splices which permits of the same being used under very adverse circumstances, such as underground or underwater pressure and at the same time provide a high degree of protection and isolation of the individual splices in the wires by a multi-wire cable.

I claim:

1. An enclosure for sheathed multi-wire cable splices, comprising a tubular housing surrounding said splice, and a bulkhead in each end of said housing on opposite sides of said splice and having its periphery fitting the bore thereof, each bulkhead having a plurality of teats projecting toward said splice and a plurality of through bores terminating at ends of said teats and through which bores the wire of said cable severally extend, said teats being in compressive relation to said wires to provide a seal around each wire.

2. An enclosure for sheathed multi-wire cable splices, comprising a tubular housing surrounding said splice, and a bulkhead in each end of said housing on oppocite sides of said splice and having its periphery fitting the bore thereof, each bulkhead having a plurality of teats projecting toward said splice and a plurality of conical through bores diminishing toward and terminating at the ends of said teats and through which bores the wires of said cable severally extend, and a lining of soft resilient plastic material in each teat in compressive relation to said wires to provide a seal around each wire.

3. A bulkhead for use in an enclosure for sheathed multi-wire cable splices, comprising a body of dielectric manually flexible organic plastic having a plurality of teats arranged to project toward said splice and also having a plurality of blind bores opening at the face of said bulkhead opposite said teats and each extending into a corresponding teat short of the end thereof, whereby severing the end of any teat converts its blind bore into a through bore for the reception of a corresponding wire of the cable.

4. A bulkhead as set forth in claim 3 wherein each bore has a liner of substantially softer plastic material than the body of the bulkhead.

5. An enclosure for sheathed multi-wire splices, comprising a tubular housing made of a soft resilient plastic material and surrounding said splice, end heads for said housing having necks of reduced diameter embracing and fitting around the sheaths of the cable and providing an enclosed chamber housing said splice, at least one of said end heads being in the form of a cup-shaped body separated from said housing and telescopically fitted to an open end thereof, a bulkhead in said housing and having its periphery fitting the interior of the contacting telescoping portion of said housing and cup-shaped body, and a ring surrounding said contacting telescoping portions and compressively urging them into engagement with each other and into engagement with said bulkhead, said bulkhead having at least one through bore through which the corresponding cable extends.

6. The combination set forth in claim 5 wherein a layer of substantially softer resilient material than said housing is interposed between said contacting telescoping portions of said housing and cup-shaped end head.

7. The combination set forth in claim 5 wherein a layer of substantially softer resilient material than said housing is interposed between said periphery of said bulkhead and the adjacent internal face of said telescoping portions of said housing and said cup-shaped body.

8. An enclosure for sheathed multi-wire cable splices, comprising a tubular housing surrounding said splice and having ends of reduced diameter embracing and fitting around the sheathing of the cable and providing an enclosed chamber housing said splice, and a splice block in said chamber made of a dielectric material and having generally parallel grooves in its sides formed to severally receive and retain the exposed connections between pairs of the metal conductors of the wires of said cables thereby to hold said connections in spaced relation to one another, rods integral with said splice block projecting outwardly from opposite sides thereof in the direction of the cable, and bulkheads integral with said rods provided at the outboard ends thereof, each bulkhead having at least one through bore arranged eccentrically with reference to said rods and through which the corresponding cable extends.

9. An enclosure for sheathed multi-wire cable splices as set forth in claim 8 wherein a ground bus bar extends through said splice block, rods and bulkheads and wherein means are provided each end of the bus bar for connection to a metallic sheath of the coresponding cable.

10. An enclosure for sheathed multi-wire cable splices, comprising a tubular housing surrounding said splice and having ends of reduced diameter embracing and fitting around the sheathing of the cable and providing an enclosed chamber housing said splice, and a plurality of enclosures for the electrically connected ends of the several wires, each of said latter enclosures comprising a pair of cup-shaped tubular members made of a soft manually resilient plastic and having enlarged ends adapted to be telescopically interfitted with one another and having opposite ends of reduced diameter embracing and fitting around the wires on opposite sides of the electrical connection therebetween, each of said cup-shaped members being provided with a liner of material substantially softer than said soft resilient plastic and arranged to provide a seal between said members and between each member and the corresponding cable.

11. An enclosure for sheathed multi-wire cable splices, comprising at least two tubular housing members having telescopically interfitted open ends and having remote ends fitting around the sheathing of the cable and providing an enclosed chamber surrounding said splice, a bulkhead in said chamber and having its periphery fitting the portion of the bore therein surrounded by said telescopically interfitted open ends of said housing members, said bulkhead having a plurality of through bores through which the wires of the cable ends severally extend, and a clamping ring surrounding said telescopically interfitted ends of said housing members and urging them into compressive engagement with each other and with said bulkhead.

References Cited in the file of this patent

UNITED STATES PATENTS

| | | |
|---|---|---|
| 472,933 | O'Connors | Apr. 12, 1892 |
| 686,832 | Peachey | Nov. 19, 1901 |
| 2,232,872 | Sietz | Feb. 25, 1941 |
| 2,621,228 | Tompers | Dec. 9, 1952 |
| 2,700,140 | Phillips | Jan. 18, 1955 |
| 2,867,680 | Stecher | Jan. 6, 1959 |
| 2,978,533 | Colbert | Apr. 4, 1961 |

FOREIGN PATENTS

| | | |
|---|---|---|
| 723,457 | Great Britain | Feb. 9, 1955 |
| 165,507 | Sweden | Dec. 2, 1958 |